Patented Feb. 6, 1934

1,945,583

UNITED STATES PATENT OFFICE 1,945,583

SEPARATION OF FINELY DIVIDED IMPURITIES FROM LIQUIDS

Rudolf Wietzel and Bruno Engel, Ludwigshafen-on-the-Rhine, Germany, assignors to I. G. Farbenindustrie Aktiengesellschaft, Frankfort-on-the-Main, Germany No Drawing. Application January 3, 1930, Serial No. 418,403, and in Germany February 9, 1929

4 Claims. (Cl. 196—147)

This invention relates to improvements in the separation of finely divided impurities from liquid hydrocarbon products, such as oils, tars or oily or tarry products.

Liquid hydrocarbon products, such as oils or tars or oily or tarry products arising from many chemical processes, such as in the distillation, cracking, destructive hydrogenation and low temperature carbonization of distillable carbonaceous materials, frequently contain finely divided impurities, also especially those of a colloidal nature, for example ashes, dust, soot, decomposition products and deposits of a polymeric nature, which greatly reduce the value of the products and the removal of which offers more or less difficulty. The same is true of the removal of the fine particles, such as are present in used transformer oils, lubricating oils, Diesel oils and the like. The usual method of filtration or centrifuging is not always practicable for the separation of such impurities because the necessary filter having an extremely small width of pores rapidly becomes clogged, and a separation by centrifuging is often uneconomical in consequence of the frequently very great frictional resistance of the fine particles which necessitates a comparatively long period of centrifuging. In many cases no substantial separation can be effected by centrifuging, for example when the particles to be removed remain suspended or colloidally dissolved under all conditions in consequence of their surface nature.

We have now found that impurities of the said kind, no matter from what source, may be removed by filtration in a very simple and advantageous manner by employing finely divided carbonaceous residues, such as are obtained in the heat treatment of carbonaceous materials, namely the destructive hydrogenation or extraction or cracking of coals, tars, mineral oils or the like, as a filter material. These residues, as is known, are semi-solid and carry with them larger or smaller amounts of bituminous substances in the form of oils, tars or asphalts. It is preferable to proceed by first filtering a suspension of the said residues in oil or another liquid through a metal wire, cloth or other filter until a sufficiently thick layer of the residues has settled or until the filter has been sufficiently permeated by the residues. The residues may also be added directly to a part of the oil to be purified itself, the filtration being commenced with this part and the filter prepared in this manner used for the filtration of the remainder of the oil. When the residues are available in the form of a paste or pulp, it is often satisfactory to apply them to the filter in this state without further treatment.

The process according to the present invention is applicable to filters of all sorts and is especially advantageous for employment in continuously working mechanical filter apparatus such as rotary vacuum filters, sieve centrifuges or the like. For example, in the employment of a rotary vacuum cell filter, one of the cells dips into the filter material, for example residues obtained in the destructive hydrogenation of coal, during the first of three constantly recurring phases, while in the second phase the oil to be purified is sucked through the filter of this cell for a shorter or longer period of time, according to the measure of the impurities to be separated, and in the third phase the filter mass together with the impurities taken up thereby is removed from the filter by the scraping or cutting device. The process can be carried out in a particularly simple manner in sieve centrifuges in which the vacuum is replaced by centrifugal force. Continuous operation for example with rotary vacuum filters becomes very simple; in many cases it is only necessary to take care that the liquid to be filtered when being poured into the apparatus always has a certain content of the residues.

The temperatures to be employed for the filtration depend, among other things, on the viscosity of the liquid to be purified. With very viscous oils elevated temperatures, for example those of 150° centigrade and more, are, generally speaking, advantageous in order to produce a satisfactory throughput. In many cases, however, ordinary temperatures are sufficient.

The purifying action of the filters prepared as hereinbefore described is, generally speaking, considerably greater than that of filters which have been provided with a layer of other finely divided substances. According to the present invention it is possible even in difficult cases to effect a practically complete separation of the finest impurities, in many cases even those of a highly colloidal nature, without the employment of additions of flocculating substances which are sometimes uneconomical and impracticable on technical grounds, and without the employment of electrical processes such as cataphoresis, or stationary separation processes. Moreover the present invention contributes to the improvement of the economy of the processes by which the residues to be employed as the filter masses are obtained, since these residues are made to serve a useful purpose before their working up proper.

The following examples will further illustrate the nature of this invention, but the invention is not restricted to these examples.

Example 1

A residue obtained in the destructive hydrogenation of brown coal which is heated to 150° centigrade, which is solid at ordinary temperatures and which contains about 70 per cent of carbon is applied by means of a spatula in a layer 1 millimetre thick onto an ordinary filter paper or a filter paper strengthened by a fabric which is in a porcelain suction filter. A mineral coal tar containing 4.8 per cent of finest particles of coal, ash and soot is filtered with the employment of a vacuum and at a temperature of 150° centigrade through the filter thus prepared. The filtrate then contains only about 0.2 per cent of solid impurities.

Example 2

A filter layer about 1 millimetre thick is produced in a sieve centrifuge, the metal sieve of which is covered with a filter cloth by pouring a residue containing about 50 per cent of solid carbonaceous matter obtained in the destructive hydrogenation of coal and which is heated to 180° centigrade, and then a producer tar which has been previously purified in a sieveless centrifuge and which still contains 2.6 per cent of solid impurites which cannot be separated in the usual manner, is poured in in a continuous stream at 120° centigrade. The tar which is projected through the filter only contains about 0.2 per cent of solid impurities which are not visible to the naked eye.

Example 3

A paste containing very finely divided solid materials and which is therefore under ordinary circumstances very difficult to filter, consisting of about 40 per cent of residues and 60 per cent of heavy oils obtained in the destructive hydrogenation of oil shale, the said paste being derived from a settling tank, is diluted with an equal volume of a light middle oil and is filtered through a drum-filter, on which a layer of finely divided solid carbonaceous materials about 8 millimetres in thickness has been previously formed. The particles of shale residues are retained on the surface of the filtering layer by means of the aforesaid finely divided solid carbonaceous materials forming the said layer and are therefore prevented from clogging the pores of the filter cloth, a rapid filtration being thus obtained. When the upper layer of finely divided solid carbonaceous materials has ceased to exert its activity the stripping knife is adjusted closer to the surface of the rotating drum of the filter, so that the inactive layer is stripped off and a fresh surface of active finely divided solid carbonaceous materials is exposed. This method of procedure may be repeated until the whole of the layer of finely divided solid carbonaceous materials is stripped off. A fresh layer of finely divided solid carbonaceous materials is then applied to the filter-cloth and the process carried out again in the manner described.

Example 4

A tar from pitcoal which contains about 6 per cent of impurities in an extremely fine state of division is mixed at a temperature of between 80 to 100° C. with 8 to 10 per cent of a mixture which remains as a distillation residue by distilling a product derived from the destructive hydrogenation of pitcoal up to a temperature of about 380° C. The said mixture contains 60 per cent of solid coal, 30 per cent of asphalt and 10 per cent of heavy oils. The mixture is filtered similarly as described in Example 3 through a drum-filter. As soon as the layer of residue on the filter cloth has reached a depth of about 20 centimetres a part of the layer may be peeled off by means of a stationary knife. In this manner a filtrate is obtained in a continuous operation which contains only 0.06 per cent of solid constituents.

What we claim is:

1. In the separation of finely divided impurities from liquid hydrocarbon products by filtration, the step of filtering said liquids through finely divided semi-solid carbonaceous residues obtained in the destructive hydrogenation of carbonaceous materials.

2. In the separation of finely divided impurities from oils by filtration, the step of filtering said oils through finely divided semi-solid carbonaceous residues, obtained in the destructive hydrogenation of brown coal.

3. In the separation of finely divided impurities from oils by filtration, the step of filtering, at a temperature of about 150° C., said oils through finely divided semi-solid carbonaceous residues, obtained in the destructive hydrogenation of brown coal.

4. A filter capable of separating finely divided impurites from a liquid hydrocarbon product comprising a layer of finely divided semi-solid carbonaceous residues obtained in the destructive hydrogenation of carbonaceous materials as the filtering medium.

RUDOLF WIETZEL.
BRUNO ENGEL.